Aug. 24, 1926.
J. P. MORLEY ET AL
1,596,987
WATER HEATER
Filed Jan. 24, 1923
3 Sheets-Sheet 1
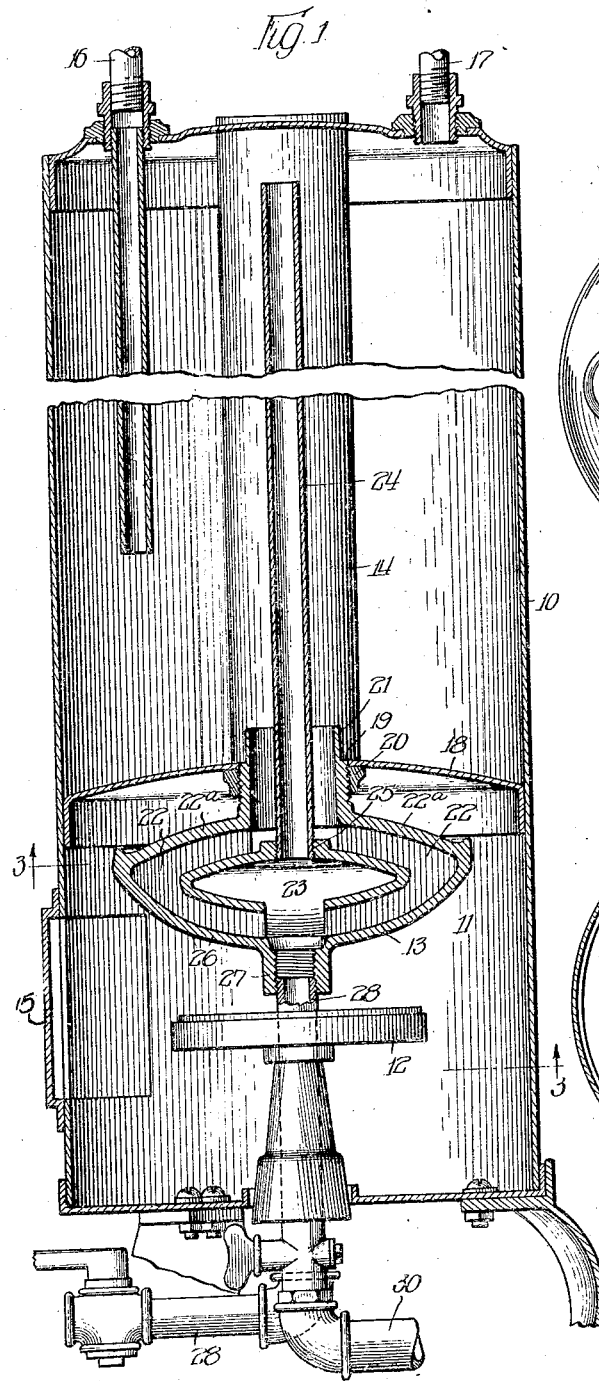
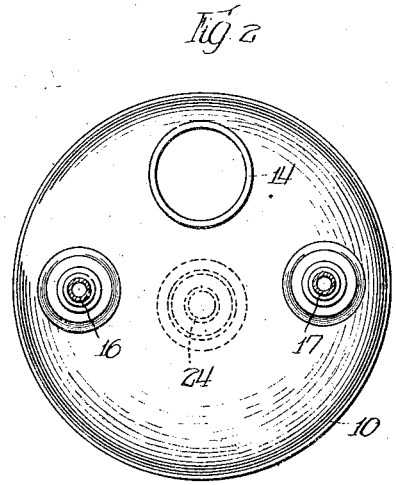
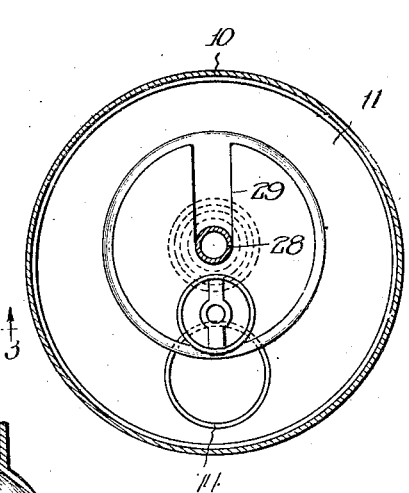
Inventors:
James P. Morley and
Fred E. Bertch,
By Harvey L. Hanson
Attorney,
Witness:
R. Burkhardt

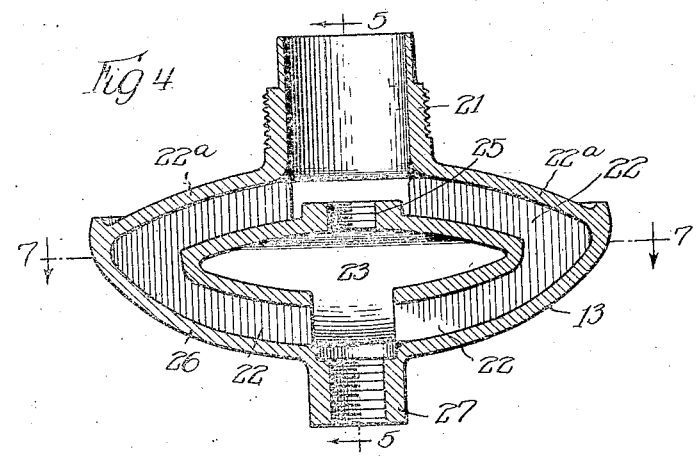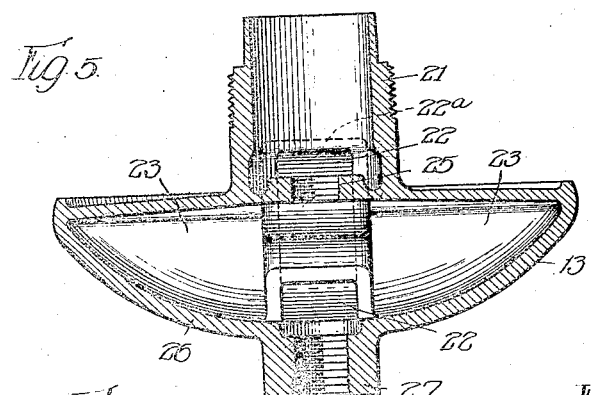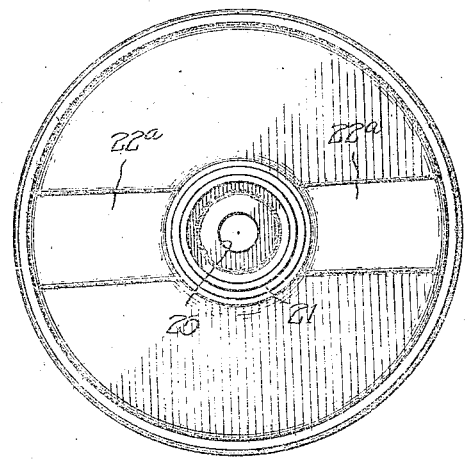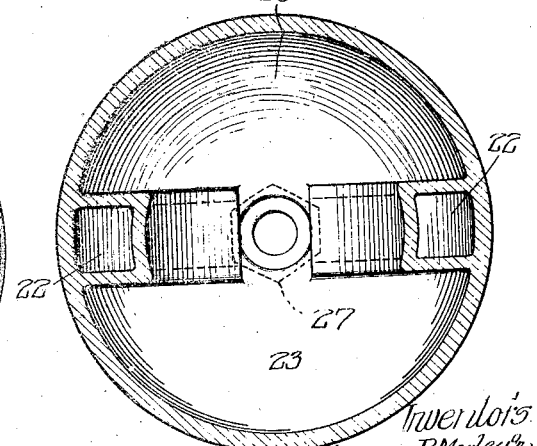

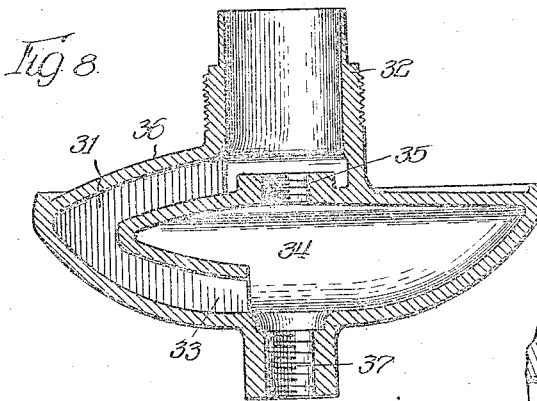
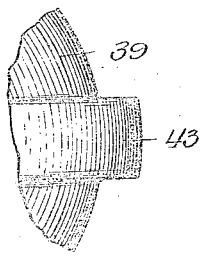
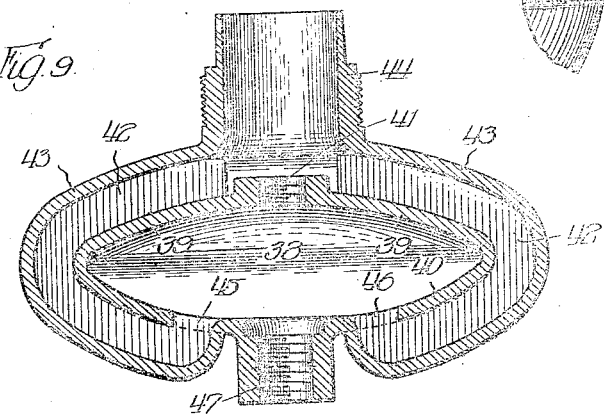
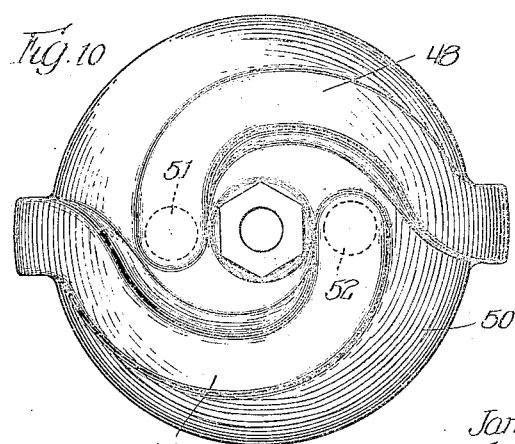

Patented Aug. 24, 1926.

1,596,987

UNITED STATES PATENT OFFICE.

JAMES P. MORLEY, OF MICHIGAN CITY, AND FRED E. BIRTCH, OF LA PORTE, INDIANA, ASSIGNORS TO BASTIAN-MORLEY CO., OF LA PORTE, INDIANA, A CORPORATION OF INDIANA.

WATER HEATER.

Application filed January 24, 1923. Serial No. 614,576.

The invention relates to water heaters for heating and supplying water in homes and other places where hot water is required.

The invention is illustrated as used in connection with a combined hot water boiler and heater, in which the tank or boiler is arranged above the combustion chamber of the heater.

The water heater of the present application is similar in some respects to the water heater shown and described in the copending application of Fred W. Birtch, Serial Number 570,738, filed June 24, 1922, to which application reference is made.

The invention relates particularly to a water spreader, which is preferably cast integrally and which is connected in a manner to permit water to flow therethrough during its circulation. The water in the spreader is subjected to heat from the burner therebelow and the water is retained in the main heating chamber and intake passages of the spreader until it is heated sufficiently to cause it to flow therefrom to the upper portion of the boiler, from which it may be drawn for use, as desired.

In the copending application of Fred W. Birtch, above referred to, a spreader is illustrated which employes passages for the cold water which introduces the water into a water heating chamber of the spreader. The passages are arranged so that one end of each of them terminates so as to deliver the water to be heated into the water heating chamber adjacent the upper portion of the chamber and into the heated water contained in the upper portion of this chamber.

The present invention has for its general objects to improve the efficiency of the spreader, for economy of fuel consumption, increase of heat-rise on a single traverse of the raw water through the spreader, and activity of circulatory action; as well as to attain a simple, desirable and economical construction that may be made with facility as a single casting requiring merely the addition of ordinary piping to accommodate its installation in connection with the boiler.

To the first stated end, one more specific object of this invention is to provide an improved construction for delivering the water into the heating chamber, and particularly so that the inflowing water will be delivered to the lower portion of such chamber to mingle with the lower portion of the heated water confined in such chamber, and so that the incoming, relatively cooler waterbody is thus subjected to the high heat impinging upon the bottom wall of the spreader adjacent the center thereof.

A correlated object of the invention is to provide a spreader which has one or more water-intake passageways that extend downwardly along the spreader, for discharge of the inflowing water into the main heating chamber as described, one wall of each such downwardly extending passage being in direct contact with the heat emanating from the burner. Preferably such wall is a portion of the downwardly bulged or partispheroidal bottom wall of the spreader, but is of only relatively small area as compared with the remaining area of that bottom wall which forms part of the boundary of the main heating chamber. By such arrangement, manifestly, the flow tendency in the descending intake passage, under the influence of the strong heat impinging on the bottom wall, would be quite a strong tendency to rise in such passage (rather than descend as required by its destined circulation) and the water in traverse through such passageway is substantially raised in temperature. yet the preponderating effect of the still-hotter water body in the heating chamber compels proper directional circulation, and since only a relatively small amount of water is in circulatory traverse through the passageways at any one time, and the delivery of the inflowing water is to the central bottom portion of the heating chamber as above described, the circulation is very active and the time that is required to secure quite a high rise of temperature is brief.

A further object of the invention is to arrange the entire extent of the inflow passages and connections harmoniously with this securing of a substantial preheating, and reverse-flow tendency of the inflowing water, yet to afford to the main heating chamber a very large preponderance of effective heating surface and to minimize the chilling effect of the inflowing water upon that portion of the water-body which, in the main heating chamber, has attained its maximum temperature.

It is an object of the invention to provide a water heater of circular outline having no mechanical restrictions that tend to prevent free circulation of the water under the action of the heat which will effectively, economically, and rapidly heat the water; which will assist in causing the constant circulation of the water; which will eliminate the necessity for the use of a heating coil; which will reduce the clogging due to the accumulation of lime, sediment, and other matter to a minimum, and which will also reduce the cost and expense of manufacture, installation, and operation of the water heater.

The invention will be explained and more readily understood when read in conjunction with the accompanying drawings, in which various embodiments of which the invention is susceptible are illustrated, it being, therefore, obvious that various other modifications may be made without departing from the spirit of the appended claims forming a part hereof.

In the drawings:—

Figure 1 is a vertical, longitudinal section of a hot water tank having a water spreader embodying the invention associated therewith and illustrating a burner cooperatively arranged with respect thereto.

Figure 2 is a top plan view of the tank shown in Figure 1.

Figure 3 is a section taken on line 3—3 of Figure 1.

Figure 4 is a vertical section of the spreader illustrated in Figure 1.

Figure 5 is a section taken on line 5—5 of Figure 4.

Figure 6 is a plan view of the structure shown in Figures 4 and 5.

Figure 7 is a section on line 7—7 of Figure 4.

Figure 8 is a sectional view similar to Figure 4, showing one modified arrangement employing a single water passage in the spreader.

Figure 9 is a vertical sectional view of still another modified arrangement, showing the cold water inlets to the heating chamber arranged exteriorly of the spreader.

Figure 10 is a bottom plan view of another modified arrangement, showing the water inlets arranged exteriorly of the spreader and arranged to produce spiral outlines.

Figure 11 is a plan view of a fragment of the structure illustrated in Figure 9.

In the structure illustrated in the drawings the water spreader is shown as associated with a hot water tank or boiler 10. The lower portion of the tank 10 is constructed to provide a housing or combustion chamber 11, in which the burner 12 and the water spreader, generally designated 13, are arranged. The burner 12 may be of any suitable construction which will readily burn gas, oil, or other desirable fuel. The combustion chamber 11 is provided with a flue 14, through which the burnt gases may escape and pass from the room in which the tank is placed. The flue, or passage, is offset with relation to the burner and spreader, so that the burner and spreader may be arranged concentrically within the heating chamber. This arrangement permits the flame and heat emanating from the burner of the heater to be equally distributed over the area of the bottom of the tank, which adds to the efficiency of the structure, and it also permits the flue to pass through the interior of the tank, so that the heated gases contained in the flue contribute their heat to the water in the tank. The lower portion of the tank is also provided with a door 15, whereby access may be had to the various devices arranged within the chamber 11.

The upper portion of the tank or boiler 10 provides a means in which the water to be heated may be confined, and to which and from which the water may be supplied and discharged, respectively. For the purpose of supplying and discharging the water, the upper portion of the tank 10 is provided with a cold water inlet 16 and a hot water outlet 17. The inlet and outlet connections are of the usual construction in tanks of this character, and, therefore, a detailed description thereof is unnecessary.

The tank 10 is provided with a separating and dividing wall or partition 18, which separates the combustion chamber 11 from the upper portion of the tank in which water to be heated is confined. The wall 18 is apertured at 19 and is provided with a collar 20 having internal screw threads. The apertures 19 and the collar 20 are centrally arranged in the dividing wall 18 and provide a means whereby the water spreader 13 may be cooperatively associated with the tank.

To permit the association of the water spreader with the apertured portion of the partition 18, the water spreader is provided with the externally threaded, tubular extension 21.

The extension 21 is threaded into the aperture 19, and provides a connection between the water spreader and the interior of the tank 10. The tubular extension 21 permits the water to be heated to descend from the tank 10 through the two cold water intake passages 22 to the heating chamber 23 of the water spreader 13, in which it will be heated. The cold water intake passages 22 are disposed diametrically opposite each other. The action of the heat on the water in the heating chamber 23 within the spreader causes the heated water to travel towards the upper portion of the chamber 23 and ascend therefrom through the circulating pipe 24 into the interior of the water tank. It will be noted that the diametrically disposed cold water intake passages 22 are arranged so that their discharge ends, or those ends thereof which communicate with the interior of the chamber 23, in which hot water is located until sufficiently heated, terminate within the chamber 23 and are arranged with relation to this chamber, so that the relatively cold, incoming water will be discharged into the lower portion of the chamber 23, or, in other words, the water will be discharged into the lower portion of the heated water located in the chamber of the spreader and be discharged into a different zone from that occupied by the relatively hot water contained in the upper portion of this chamber.

It is manifest that a spreader constructed in this manner will discharge only a relatively small amount of cold water into the hot water chamber 23, and, by reason of the fact that the water is discharged into the coolest portion of the water confined in this chamber and directed toward the wall of this chamber which is subjected to the heat from the burner, the temperature of the heated water will not be materially reduced, which will thus add to the efficiency of the structure and permit a given volume of water to be heated in a relatively short period of time.

The hot water chamber 23 is provided with a threaded opening 25, into which the circulating pipe 24 is threaded. The action of the heat on the water in the heating chamber 23 within the spreader 13 causes the heated water to ascend in the circulating pipe 24 and be discharged therefrom into the interior of the water heater chamber 10. The lower, convex wall 26 of the water spreader is formed of relatively thin material, is curved or dished, as indicated, and will thus provide an increased surface, against which the flame of the burner may act, and thereby heat a given volume of water very rapidly. The water spreader is constructed in such a manner that the upper portion of the cold water intake passages 22 extend above the top of the chamber 23 as at 22ª.

It will be noted, by referring to Figure 1, that the tubular extension 21 and the circulation pipe 24, which is threaded into the aperture 25, are arranged concentrically and in spaced relation to each other, which permits the relatively cold water to pass downward in said tubular extension 21 outside the circulation pipe 24 in its travel from the interior of the tank 10 through the passages 22 into the heating chamber 23 of the water spreader. This arrangement affords various advantages, assisting in reducing the time or period necessary in heating a given amount of water and, in addition, reduces the labor necessary when the parts are to be associated with or disconnected from each other.

The convex wall 26 of the spreader 13 is provided with an extension 27, which is threaded to receive a drain pipe 28, whereby the water compartment of the tank 10 and the water spreader 13 may be drained of any water contained therein. The burner 12 is provided with a slot 29 for the reception of the vertical portion of the drain pipe 28, which permits the burner to be arranged directly beneath the water spreader 13. Gas, or other fuel, is supplied to the burner by the supply pipe 30, which is provided with the usual fittings.

In the modified arrangement illustrated in Figure 8 the water spreader shown substantially corresponds with that illustrated in Figures 1 to 7, differing, however, in that one of the cold water intake passages is eliminated. In this modified structure, a single cold water intake passage 31 communicates at one end with the tubular extension 32 and has its opposite end 33 arranged so that it will discharge the relatively cold water to the bottom of the heating chamber 34 in a manner identical with that described in connection with the spreader of the water heater shown in Figures 1 to 7. The upper wall of the chamber 34, which latter is increased in size somewhat because of the omission of the cold water passage from one side thereof, is provided with a threaded aperture 35 for the reception of a circulating pipe similar to that designated 24 in Figure 1. In this modified structure the cold water passage has a portion thereof 36, arranged exteriorly of the chamber 34. The discharge end of the passage 33 terminates within the chamber 34. A drain connection 37 is provided, which is similar to that previously described in connection with the structure shown in Figures 1 to 7.

In the structures illustrated in Figures 9, 10, and 11 the cold water passages are arranged entirely exteriorly of the heating chambers of the spreader. In the structure illustrated in Figures 9 and 11 the heating chamber 38 includes the walls 39, and 40, the wall 39 being provided with a threaded aperture 41 for the reception of the threaded end of a hot water circulating pipe, such as is designated 24 in Figure 1. The cold water intake passages 42 and 43 are connected with a tubular extension 44 which is threaded to permit of the association of the spreader with the wall 18 of the hot water tank 10. The passages 42 and 43 extend from the tubular extension 44 to below the wall 40 of the chamber 38. This wall 40 is apertured, as indicated at 45 and 46, to permit the relatively incoming cool water, which passes through the passages 42 and 43, to be introduced into the lower portion of the chamber 38 and also into the lower portion of the heated water in the heating chamber. This structure is provided with a drain connection 47 similar to that previously described in connection with the structure shown in Figures 1 to 7.

In the modified arrangement illustrated in Figure 10 the cold water passages are also arranged exteriorly of the water chamber of the spreader but differ in their outlines from the structure illustrated in Figure 9. In this last named structure two passages 48 and 49 are employed, which are arranged wholly exteriorly of the walls forming the chamber of the spreader. The passages 48 and 49 are preferably curved or spiralled on the bottom wall 50 in the manner illustrated and terminate at the bottom of the spreader in a communication with the interior of the spreader through the medium of the openings 51 and 52 (shown in dotted lines) which permit the water to pass through the passages 48 and 49 from the tank 10 to also allow the relatively cool water to be introduced in the lower portion of the heating chamber of this structure.

From the foregoing description it is evident that an arrangement is provided whereby the relatively cool water entering the heating chamber of the spreader will be caused to be introduced into the lower portion of the chamber into the zone of the relatively cool water contained in this chamber and will be directed toward the wall of this chamber which is in direct contact with the flame emanating from the burner. This method of introducing the water has been found to materially reduce the time necessary for heating a given quantity of water. It is evident that the relatively cool water introduced into the body of water to be heated is introduced into that portion thereof which is the coolest, thus differing from the structure illustrated in the copending application hereinbefore referred to, in which structure the relatively cool water is permitted to be introduced into the hot water heating chamber of the spreader at a point adjacent the hottest portion of the water confined in this chamber.

While various forms of water spreaders employing one or two water intake passages of the types illustrated have been shown and referred to, it will be readily understood that the invention is not to be limited to the particular forms or numbers of these water intake passages, but it will be understood that water intake passages of varying forms and in varying numbers may be employed in the water spreader.

Having thus described the invention, what we claim and desire to secure by Letters Patent is:—

1. A water spreader having a bottom surface to be directly exposed to the flame, a portion of said surface down-sloping from its margin toward its center, said spreader having other walls which, together with said bottom, bound a main heating chamber having a hot water outlet from its upper portion, and also bound a cold water intake passage, said intake passage extending downwardly and inwardly, following the down-sloping portion of the bottom wall, and at its lower end opening into the main heating chamber adjacent the central bottom portion of the latter.

2. A water spreader wherein the walls are a unitary casting, having a bottom wall to receive heat impingement, and formed with a down-slope from margin to center, other walls which, together with a minor fractional portion of said bottom wall bound a cold-water intake passage which extends downwardly and inwardly along said bottom wall, and additional walls which, together with the remainder of the bottom wall, bound a main heating chamber having a top outlet opening, and into the central bottom portion of which chamber the intake passage opens.

3. A water spreader having a heating chamber with a top hot water outlet and affording a relatively large wall surface as an exterior wall of the structure, and having an intake passage following a portion of the wall of said chamber and affording a much smaller outside-wall area, a portion of said inlet passage extending downwardly along a wall of said chamber which is directly exposed to flame impingement, the outside wall of said passage, throughout the stated portion, being directly exposed to flame impingement.

4. A structure as set forth in claim 3, wherein the intake passage extends outwardly across the top wall of said chamber, and downwardly and inwardly across the bottom surface of said chamber, and opens to said chamber at the bottom thereof and adjacent its center.

5. A water spreader having a heating chamber provided with a hot water outlet adjacent the center of its top, and an intake passage with a receptive orifice surrounding said outward opening and its delivery end communicating with the lower portion of said chamber adjacent the center of the latter, said intake passage extending from said orifice outwardly across the top portion of said chamber and downwardly and inwardly along the bottom of said chamber, a wall of said downwardly and inwardly extending portion being exposed directly to heat impingement, and said chamber having a bottom wall of much greater area than the stated portion of the intake passage also exposed directly to heat impingement.

6. A water spreader having means whereby it may be supported relatively to a water tank in which water to be heated is confined, a spreader having a chamber with part of its bottom surface exposed for heat impingement, a connection through which water to be heated must flow before reaching the chamber, a connection through which the heated water is discharged from the chamber, said last-mentioned connection being arranged within the first-mentioned connection, and a tubular passage leading outwardly from the first-mentioned connection, and thence inwardly and terminating in the lower portion of the chamber, said tubular passage affording an exteriorly exposed surface of much smaller area than the exteriorly exposed surface of the chamber.

7. A water spreader having means whereby it may be supported relatively to a water tank in which the water to be heated is confined, said spreader having a heating chamber, a connection through which water to be heated will flow before reaching the chamber, a connection through which the heated water is discharged from the chamber, a tubular passage extending from said first-mentioned connection outwardly across the top of the chamber and thence downwardly and inwardly across the bottom of the chamber and terminating in the lower portion of said chamber, said passage, on the under side of the spreader, affording an exterior surface to receive direct impingement of heat, which surface is much smaller than the bottom exposed surface of the heating chamber.

8. A water spreader having means whereby it may be supported relatively to a water tank, said spreader having a chamber, a connection between the tank and the spreader for water inflow, a discharge connection from the top of the spreader to the tank, and a plurality of tubular passages communicating with the first-mentioned connection at their upper ends, and at their lower ends communicating with the central bottom portion of said chamber, portions of said passages being extended downwardly along the bottom of said chamber, and affording area for direct impingement of the flame much smaller than the bottom area of the chamber so exposed to the flame.

9. A water spreader having a relatively large chamber with a wall surface for direct exposure to a flame, an outlet connection from the upper portion of said chamber, and a tubular intake passage opening at its lower end to the lower portion of said chamber, said tubular passage extending downwardly along the flame-receptive surface of said chamber, and itself exposing to the flame a wall area much smaller than the exposed wall area of said chamber.

10. A water spreader having a heating chamber provided in its upper portion with a hot water outlet, a connection through which water may flow before reaching the chamber disposed above the top of said chamber, and an intake passage opening at its upper receptive end to said connection, and at its lower, delivery end opening to the lower portion of said chamber, said intake passage comprising two portions, one extending outwardly across and above the top wall of the chamber, and the other extending downwardly and inwardly above the bottom wall of the spreader structure, said bottom wall being adapted to receive direct heat impingement and the area thereof forming part of the bottom of said chamber being larger than the area thereof that is overlain by the lower portion of the intake passage.

11. A water spreader formed in a single casting with walls bounding respectively a heating chamber and an intake passage, said intake passage having a delivery opening to said chamber adjacent the central bottom portion of the latter, and said intake passage having a receptive orifice above said chamber adjacent the center of the latter, a portion of the wall of said intake passage being afforded by the bottom wall of the spreader and extending downwardly and inwardly across the latter to receive direct impingement of the heat applied to said spreader, the portion of said bottom wall of the spreader bounding the said passage being much smaller than the portion of such wall bounding the bottom of the chamber.

12. A structure as defined in claim 11, wherein the upper portion of the intake passage is formed by walls projecting above the top wall of said chamber, and the downwardly extending lower portion of said passage being formed by walls lying within the body of the spreader.

In witness whereof, we hereunto subscribe our names this 18 day of January, A. D., 1923.

JAMES P. MORLEY.
FRED E. BIRTCH.